(12) United States Patent
Hollinger

(10) Patent No.: US 10,194,209 B2
(45) Date of Patent: *Jan. 29, 2019

(54) AUTOMATIC DISPLAY OF CLOSED CAPTIONING INFORMATION

(71) Applicant: Roku, Inc., Los Gatos, CA (US)

(72) Inventor: Joseph Hollinger, Los Gatos, CA (US)

(73) Assignee: ROKU, INC., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,271

(22) Filed: Aug. 29, 2017

(65) Prior Publication Data

US 2018/0146259 A1 May 24, 2018

Related U.S. Application Data

(63) Continuation of application No. 15/357,319, filed on Nov. 21, 2016, now Pat. No. 9,749,700.

(51) Int. Cl.
*H04N 7/08* (2006.01)
*H04N 21/488* (2011.01)
*H04N 21/442* (2011.01)
*H04N 21/466* (2011.01)
*H04N 21/472* (2011.01)

(52) U.S. Cl.
CPC ... *H04N 21/4884* (2013.01); *H04N 21/44213* (2013.01); *H04N 21/4667* (2013.01); *H04N 21/47217* (2013.01); *H04N 7/08* (2013.01)

(58) Field of Classification Search
CPC ...................................................... H04N 7/08
See application file for complete search history.

(56) References Cited

U.S. PATENT DOCUMENTS

| | | | |
|---|---|---|---|
| 2011/0128443 A1* | 6/2011 | Blanchard | H04H 20/31 348/468 |
| 2015/0271442 A1* | 9/2015 | Cronin | G10L 15/26 348/464 |

* cited by examiner

*Primary Examiner* — Michael H Hong
(74) *Attorney, Agent, or Firm* — Sterne, Kessler, Goldstein & Fox P.L.L.C.

(57) ABSTRACT

Disclosed herein are system, method, and computer program product embodiments for the automatic display of closed captioning information. An embodiment operates by providing a program for display on a user device. A plurality of closed captioning requests associated with the program are determined. It is determined that the plurality of closed captioning requests exceed a first threshold. A start time and an end time corresponding to the plurality of closed captioning requests are determined. Closed captioning corresponding to the program is provided for display between the start time and the end time.

20 Claims, 7 Drawing Sheets

AUTOMATIC DISPLAY OF CLOSED CAPTIONING INFORMATION

CROSS REFERENCE TO RELATED APPLICATIONS

This application is a continuation of U.S. patent application Ser. No. 15/357,319, filed Nov. 21, 2016, entitled "Automatic Display of Closed Captioning Information," which is hereby incorporated by reference in its entirety.

BACKGROUND

Field

The field is generally related to intelligently providing closed captioning information.

Background

Closed captioning information can be helpful for users to determine what is being said when watching television shows or movies. Users often have the option of manually turning on and off closed captioning when watching programming that has closed captioning available. However, when closed captioning is off, a user may miss what was said while watching or listening to content (such as a movie to TV show), and thus may have to rewind the content and turn on closed captioning to determine what was said (assuming rewinding is even available, which may not always be the case). This process can be cumbersome for users and may detract from the enjoyment of whatever is being watched.

SUMMARY

Systems, methods and computer program products for the automatic display of closed captioning information are provided. According to some embodiments, user behavior information is accessed for a program, where the user behavior information includes information associated with closed captioning requests. Based on the user behavior information, it is determined that multiple closed captioning requests overlap during a portion of the program. A start time indicating when to begin and an end time indicating when to end display of closed captioning information for the overlapping portion is determined. The program, including both the start time and the end time corresponding to the overlapping portion, is provided for display, wherein during display of the program, the closed captioning information is automatically displayed between the start time and the end time.

BRIEF DESCRIPTION OF THE DRAWINGS

The following figures depict various embodiments for illustrative purposes. From the figures and corresponding description, different embodiments may be employed without departing from the invention as described herein.

DETAILED DESCRIPTION

Figure 1:
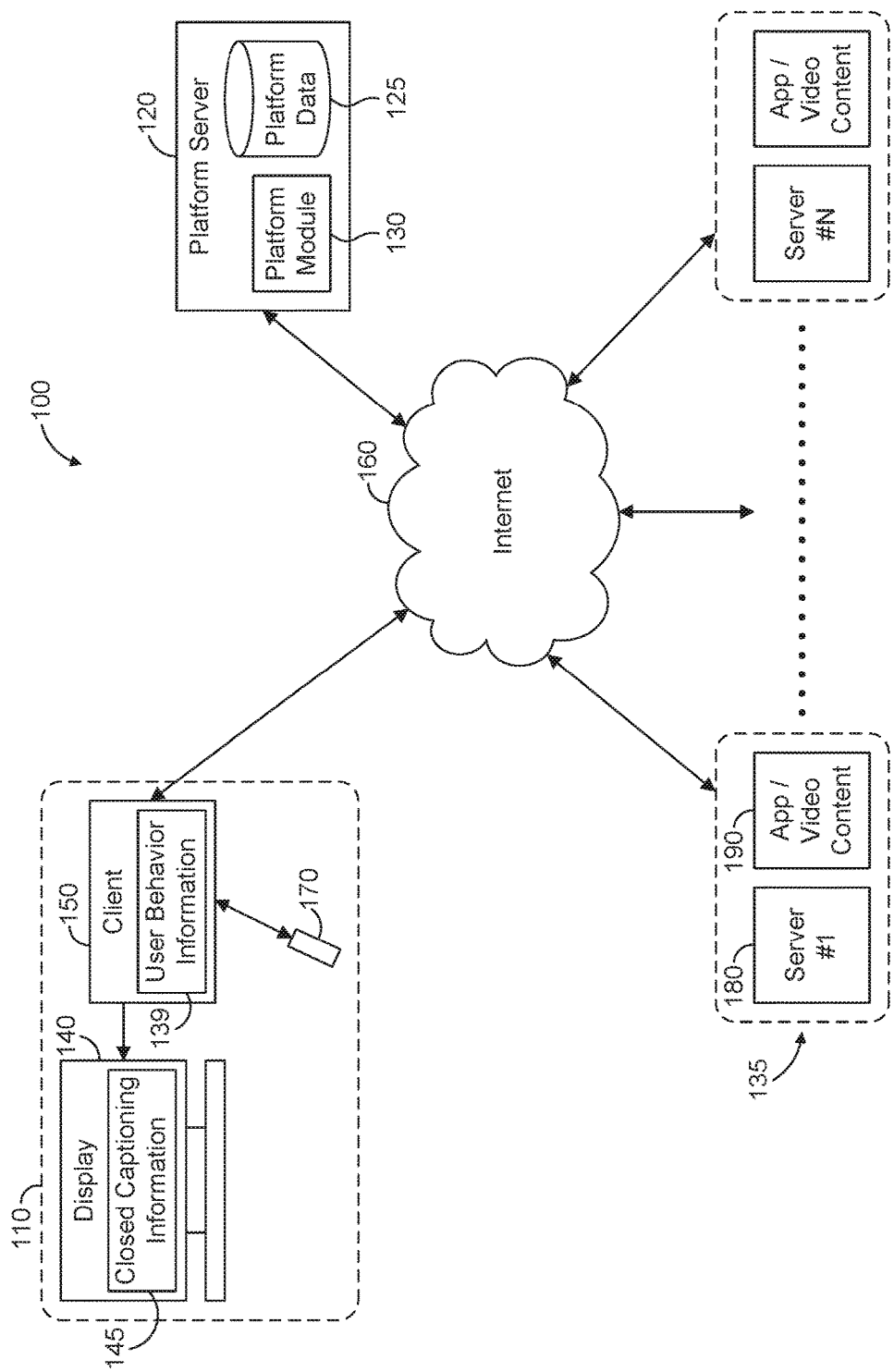
FIG. 1 illustrates a system configured in accordance with some embodiments.

FIG. 1 illustrates a streaming environment 100. The streaming environment 100 includes an interface system 110, a platform server 120 and one or more sources of content programming 135. In one embodiment, the interface system 110 includes a display device 140 (e.g., monitor or television), a client device 150 (e.g., a streaming media player) and a user input device 170 (e.g., a remote control). The client device 150 is configured to communicate with the display device 140 and a network 160. In some embodiments, the client device 150 may be part of, within or integrated with display device 140; in other embodiments, client device 150 and display device are distinct components. While FIG. 1 is described herein as a "streaming" environment 100, embodiments are applicable to any system, apparatus, component, method, application, etc., for the presentation of content to users, including non-streaming applications.

In one embodiment, the platform server 120 includes a database 125 of platform data and a platform module 130. The database 125 is configured to store data such as programming software packages. The data within these programming software packages may include the network locations and content descriptions of content sources 135, hardware/software capabilities of different firmware versions and specifications of the client device 150, customer data associated with each client device 150 and user interface information associated with the client device 150.

In one embodiment, the customer data may include customer specific information such as demographic data, geographic data, ISP identification, and financial information. In one embodiment, the platform server 120 generates customized user interfaces for each of the client devices 150. In one embodiment, the user interface from the platform server 120 provides a selection of content such as audio, visual and gaming content to the client device 150. In this example, the platform server 120 is configured to supply a graphical representation of available content to the client device 150. The client device 150 selects and accesses individual content through this graphical representation.

In one embodiment, the platform server 120 is configured to receive input from client device 150 and processes or stores the input through the platform module 130. The input from the client device 150 includes navigation and selection commands which may represent selection of content, search for content and ongoing interaction with an application running on the platform server 120, closed captioning requests, or other user behavior information 139. In an embodiment, user behavior information 139 may be captured and/or stored at input device 170. User behavior information 139 may periodically be provided or made available to platform server 120.

In one embodiment, the client device 150 displays content on display device 140. In one embodiment, the content displayed on the display device is sourced from the client device 150, the platform server 120 and/or the content source 135, or any combination thereof. In one embodiment, the input device 170 transmits signals to the client device 150. In one embodiment, the input device 170 utilizes one of or a combination of an infrared signal, radio frequency signal (e.g., Bluetooth signal) to communicate with the client device 150. In an embodiment, display 140 may display closed captioning information 145 as well as other video display data. Closed captioning information 145 may include textual or visual representations of audio, voice, or other sounds that may be heard or intended to be heard during a playback of a program. In an embodiment, closed captioning information 145 may include language translation information or other subtitle information.

The input device 170 is configured to enter data and to make user selections from the interface as presented through the client device 150. In one embodiment, the interface supplied by the client device 150 is based on the platform server 120, from the content sources 135 or locally from the client device 150. In one embodiment, the input device 170 also includes a display to show additional content. In another embodiment, the input device 170 may include a touch screen which allows content to be displayed and input to be received. Exemplary input devices 170 include dedicated remote controls, smart phones, tablets, mobile computers, etc., to name a few examples.

In one embodiment, the content sources 135 include a server 180 and a storage device 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, movies, TV programming, still pictures, closed captioning information, text, graphics, gaming applications, computer programs, multimedia, or any other type of content. In one embodiment, the particular content which is stored within the storage device 190 is provided to the client device 150 through the network 160. In one embodiment, the network 160 is the Internet. In another embodiment, the network 160 is a local area network. In yet another embodiment, the network 160 is a satellite based network or a terrestrial network. Network 160 may be wired or wireless, or a combination of both.

In one embodiment, the client device 150 makes a request for specific content. If the requested content is video content, the storage device 190 transmits video data that represents the specific video content to the client device 150 through the content source 135. In one embodiment, platform server 120 supports interfaces, such as login interfaces, search interfaces and customized interfaces for the client device 150.

Figure 2:
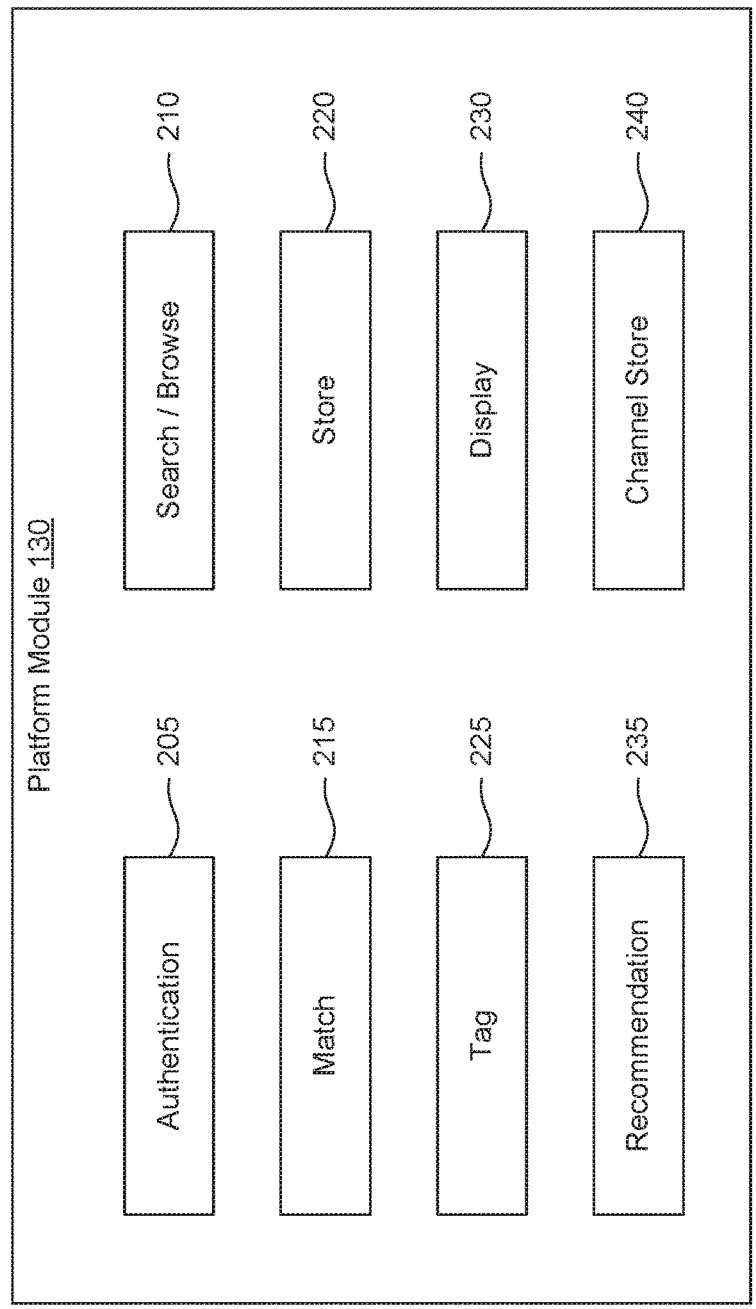
FIG. 2 illustrates server modules utilized in accordance with some embodiments.

FIG. 2 illustrates a representative platform module 130. In one embodiment, the platform module 130 includes an authentication module 205, a search/browse module 210, a match module 215, a store module 220, a tag module 225, a display module 230, a recommendation module 235 and a channel store module 240.

The authentication module 205 interacts with the client device 150 and authenticates a profile or user account associated with the particular client device 150. For example, the profile includes data associated with a user such as the user name, password, device associations, IP addresses, location, email address, payment information and content subscriptions. In one embodiment, the authentication module 205 recognizes and authenticates the client device associated with a particular user account through password authentication, location authentication, visual authentication or audio authentication. The authentication can be configured to occur when setting up a new client device 150, purchasing content or subscriptions or periodically as needed.

The search/browse module 210 is configured to detect input from a client device 150 and/or the input device 170. In one embodiment, the input represents the selection of a channel, content or application. In another embodiment, the input represents a textual, visual or audible search for content, a channel or application. In yet another embodiment, the input represents browsing content, channels or applications.

The match module 215 coordinates searches and requests for content, channels and applications. For example, the match module 215 identifies relevant content, channels and applications based upon the search criteria. In one embodiment, the match module 215 relies on titles, tags, description and reviews associated with the content, channels and applications to determine relevance of the match.

The store module 220 coordinates the storage of data within the platform server 120. The data coordinated by the store module 220 includes content listings and corresponding descriptions, user profiles, searching and browsing requests, content viewed, channels and applications utilized, tags and friends. In an embodiment, store module may include user behavior information 139. Depending on the nature of the data, access to the content is controlled to prevent unauthorized use.

The tag module 225 coordinates the creation and use of tags associated with content, channels and applications. Tags can be assigned to channels and applications by the author of the channels and applications or by users through the client device 150. Tags can also be assigned to portions of audio and video streams by the author of the audio and video streams or by users through the client device 150. The tags may describe the corresponding content or allow an opportunity for a user to provide commentary associated with the corresponding content. The tags can be used for personal use and searched by the user creating the tags or the tags can be aggregated among multiple users and searched through a public database.

The display module 230 coordinates display of representative content and user interfaces from the platform server 120 to each of the client devices 150. Examples of representative content include listings and descriptions of channels, content and applications. The user interface is configured to allow searching and browsing for channels, contents and applications. In an embodiment, display module 230 may track and coordinate the display (including both manual and automatic display) of closed captioning information 145.

The recommendation module 235 is configured to process content recommendations based on a combination of current subscriptions, browsing or searching input and content source. Further, the recommendation module 235 also can utilize tags to provide recommendations. In another embodiment, the recommendation module 235 utilizes the availability of the content to provide a recommendation. For example, a viewing window which describes when the content is available for viewing describes a beginning and end date for the availability of the content. Further, the recommendation module 235 can also utilize the subscription data associated with each user account to determine whether the content is available to the user without additional charge because the account user is already subscribed to the content provider. Further, the recommendation module 235 can also prioritize content that is available free of charge without any subscriptions. In another embodiment, the recommendation module 235 can prioritize content based on popularity ratings as illustrated under the public viewing data 335.

The channel store module 240 is configured to manage subscriptions of channels associated with each client device 150. Channels often contain content such as video content and audio content. In one embodiment, access to the content within a channel requires a subscription to that channel, but the subscription is free. In another embodiment, access to the content within a channel requires a paid subscription. In yet another embodiment, access to some content and applications require payment and a subscription. In one embodiment, the channel store module 240 manages the addition of channels, content and applications. Similarly, the channel store module 240 also manages deletion or modifications to channels, content and applications.

Figure 3:
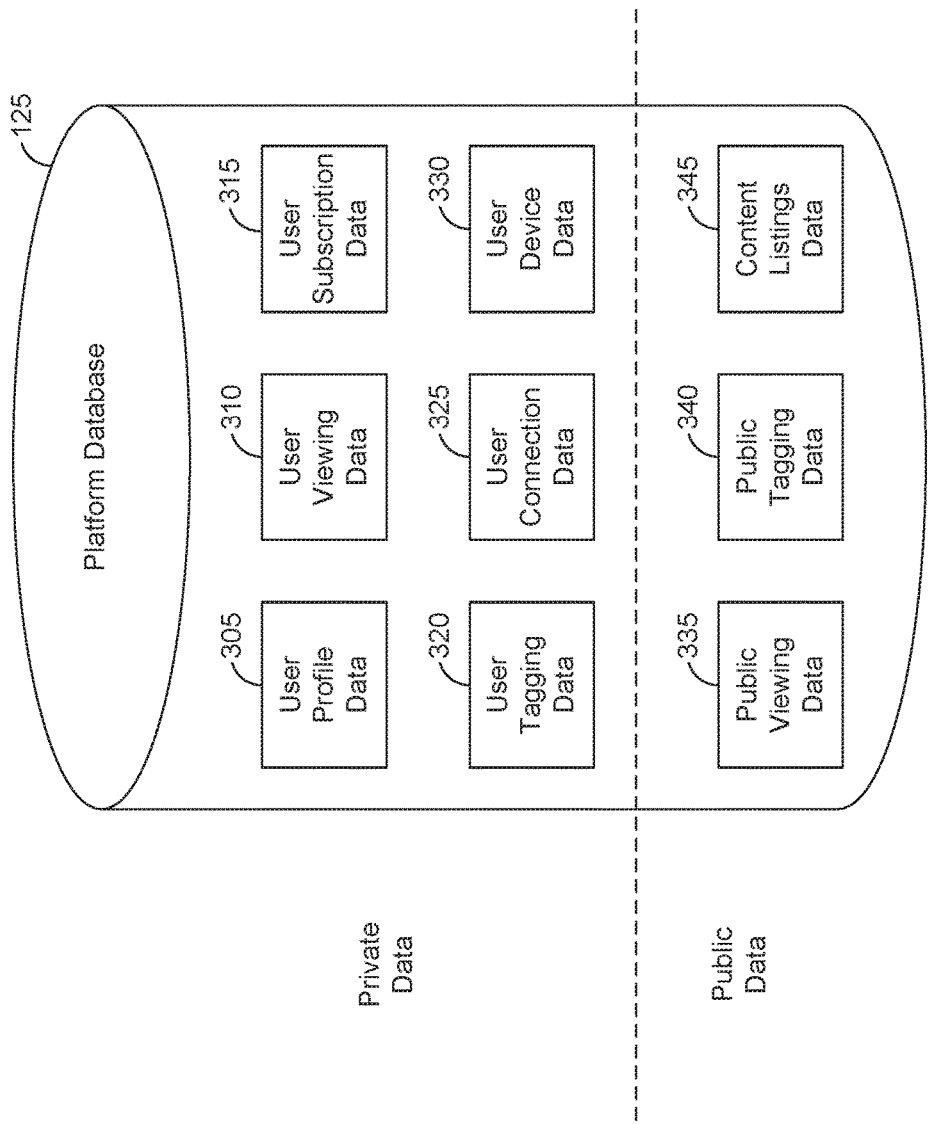
FIG. 3 illustrates server data utilized in accordance with some embodiments.

FIG. 3 illustrates a representative platform database 125 as shown in FIG. 1. In one embodiment, the platform database 125 includes private data and public data. The private data contains information which is associated with a particular user; the public data contains information that is aggregated and not associated with a particular user. The private data within the platform database 125 includes user profile data 305, user viewing data 310, user subscription data 315, user tagging data 320, user connection data 325 and user device data 330. The public data within the platform database 125 includes public viewing data 335, public tagging data 340 and content listing data 345.

In one embodiment, utilization of the private data is restricted to access within the platform server 120 and access by the particular user to his or her own private data. Utilization of the public data can be accessed by all users and selected third parties.

The user profile data 305 includes information such as a user's name, address, credit card/payment information, age and gender. The user viewing data 310 includes the channels, audio content, visual content, video content and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based or voice based search. In another embodiment, the stored searches are implicitly identified by recording browsing choices. In an embodiment, user viewing data 310 may include user behavior information 139, indicating when a user turns on or off closed captioning (including other actions related to closed captioning such as rewind and/or volume changes) or other information when viewing one or more programs.

The user subscription data 315 includes information such as channels subscribed by a particular user and content and applications purchased by the particular user. The user tagging data 320 includes tagging information related to a particular user. For example, the tagging information can include a user's comment or description of a channel, application or content. In one embodiment, the entire content is tagged with a description as determined by the particular user. In another embodiment, a portion of the content is tagged with a description of that portion of the content by the particular user. The user connection data 325 includes a listing of other users that are associated with the particular user as a friend. In one embodiment, having users connected to each other as friends allows a particular user to share recently watched content, channel subscriptions, user tags and applications with other connected users. The user device data 330 includes a listing of devices associated with the particular user. The device includes a client device 150, an input device 170, and a mobile device such as a tablet, laptop computer or smart phone.

The public viewing data 335 includes a listing of channels, content, and applications utilized by many users in aggregate. In one embodiment, the popularity of the content is ranked based on the number of viewers and the order in which the content is viewed. For example, the higher number of views per day for content would indicate higher popularity. Further, when multiple content selections are presented next to each other, the content which is selected first for viewing is given a higher popularity rating.

The public tagging data 340 includes tags that are utilized to describe channels, content and applications from many users in aggregate. In one embodiment, the tagging data within the public tagging data 340 comes from content providers. For example, a movie studio responsible for producing a movie could provide tagging data to the public tagging data 340 that describes portions of the movie. The public tagging data also includes closed captioning and subtitles associated with respective segments of the content.

The content listings data 345 includes listings of content and descriptions of the corresponding content. In one embodiment, the descriptions include key word tagging throughout the content, a summary description of the content, directors and actors associated with the content and third party reviews associated with the content.

Figure 4:
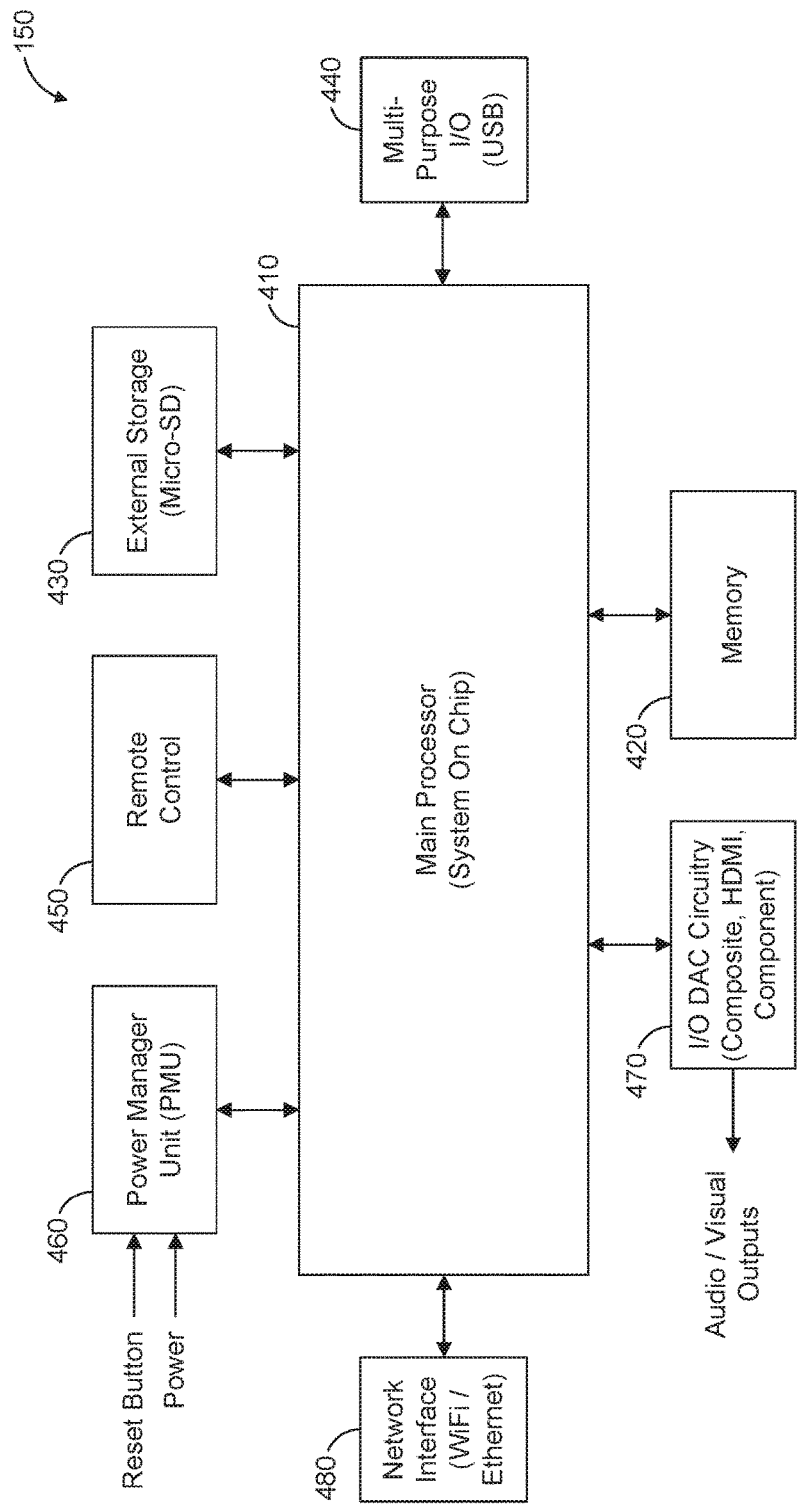
FIG. 4 illustrates a streaming media client device configured in accordance with some embodiments.

FIG. 4 illustrates a block diagram of a representative client device 150 as shown in FIG. 1. In one embodiment, the client device 150 is configured to receive streamed content for real-time playback, or playback at a later time. The client device 150 may be a media streaming device, for example. The content streamed into the client device 150 includes audio content, visual content, music, video, movies, TV programming, still pictures, closed captioning information, text, graphics, gaming applications, computer programs, multimedia, or any other type of content. In one embodiment, the client device 150 is utilized to transmit instructions and selection to the content server 135 and/or the platform server 120.

In one embodiment, the client device includes a processor 410, internal memory 420, external storage 430, multipurpose I/O port 440, input device interface 450, power management 460, audio/visual I/O interface 470 and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory and read only memory (ROM). Additional memory and memory interfaces such as the multi-purpose I/O port 440 may be provided in various embodiments, to support memories such as the external storage 430 which can include hard disks, USB drives, SD cards, and the like. These memories may also be used for storage of applications, programs, buffered media, media, executable computer code and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through a input device including any combination of virtual buttons embodied on a customization screen, physical buttons, accelerometer, gyroscope, pressure sensor, tilt sensor, magnetic sensor, microphone and light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL), composite video, etc., to name a few examples. In one embodiment, USB and Apple® Thunderbolt® enabled displays are also supported.

In one embodiment, the network interface 480 supports multiple network interfaces such as Ethernet, Wi-Fi and Bluetooth. In another embodiment, the network interface 480 also supports coaxial, digital TV antenna, satellite television, etc., to name a few examples.

Figure 5:
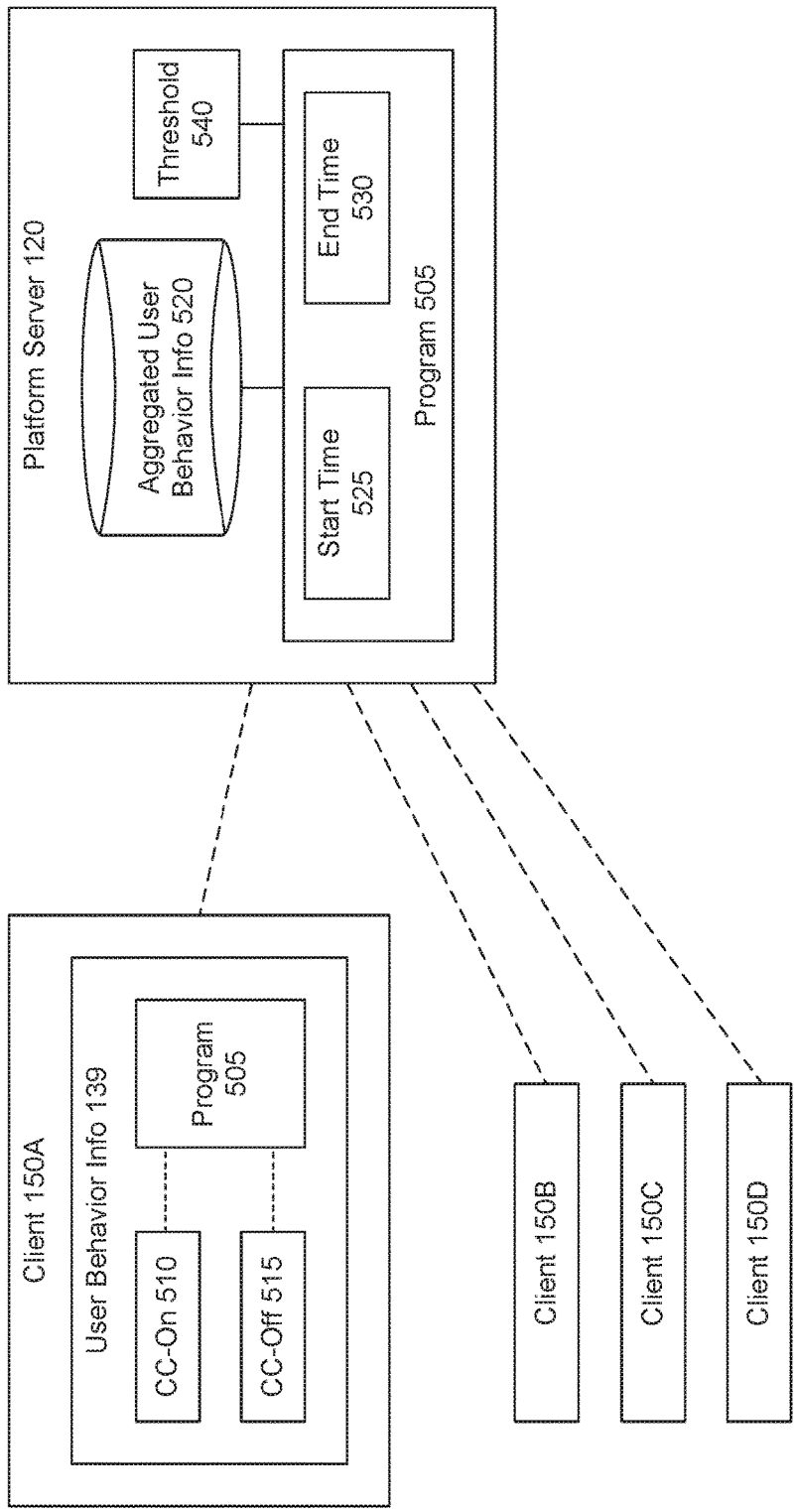
FIG. 5 is a block diagram of a system for aggregating and automatically displaying closed captioning information, according to an example embodiment.

FIG. 5 is a block diagram of a system 500 for aggregating and automatically displaying closed captioning information, according to an example embodiment. Client 150A may be a client device (set top box, television, computer, tablet, mobile phone, media server device, etc.) that is receiving a program 505 (e.g., via streaming), or has received the program 505 at an earlier time which may be stored or buffered at client 150A. Program 505 may be any multimedia content or program that may be consumed (viewed, heard, etc.) by a user at client 150A. Example programs 505 include television shows, movies, speeches, music, videos, sports, gaming applications, etc. Program 505 may include live events or previously recorded programs, which may be streamed or otherwise provided over the Internet 160 or other wired/wireless network.

While a user is watching program 505 (e.g., program 505 is being played by or provided to client 150A for playback via client 150A or another user device), client 150A may track user behavior information 139. User behavior information 139 may include any commands to client 150A requested by one or more users during playback of program 505. Such playback may include the playing of any portion of program 505 by or on client 150A. In an embodiment, the playback may include client 150A providing program 505 to another device, such as a television, other multimedia system or display 140, for playback. The commands may include any user commands provided using input device 170, provided directly on a client/set-top box (e.g., by activating commands/buttons/menu options using the box), and/or provided to another device (such as a monitor, stereo, or other multimedia device) in communication with client 150A and related to the playback.

In an embodiment, user behavior information 139 may be tracked across multiple users of a particular client 150A (e.g., a particular set-top box or user account, which may include multiple client boxes within the same household or on the same account). For example, different users may use client 150A to watch different programs 505 and may interact with client 150A in different ways, e.g., using different control devices 170 or by using different user logins. As such, client 150A may determine which commands were received from which users during playback of which programs 505.

In an embodiment, each user may have his/her own input device 170 (which may be a smart phone, for example). Or, for example, client 150A may have another means of distinguishing between different users (e.g., based on login information, user behavior patterns, etc.) In an embodiment, user behavior information 139 may track which commands were provided by which user(s) of client 150A based on from which input device 170 the command was received. If user identification is unavailable, client 150A may track user behavior info 139 across all users without distinguishing amongst users. Or, user behavior information 139 may include an aggregation across various input devices 170 and/or user profiles.

In the example of FIG. 5, although user behavior information 139 is shown as being stored or tracked by client 150A, in an embodiment, user behavior information 139 may be also or alternatively tracked and/or stored by input devices 170. For example, input device 170 may be a remote control, cell phone, touchscreen, keyboard, or other computing device with its own internal processor and/or memory. Input device 170 may receive user commands and requests to client 150, and may track which commands are entered by the user. User behavior information 139 may periodically be uploaded or otherwise provided to platform server 120.

User behavior information 139 may include information to track various user behaviors, including when a user changes channels/programs 505, turns volume up/down, records/fast forwards/rewinds, turns closed captioning on/off, and/or performs other actions. User behavior information 130 may track different combinations of commands performed in various sequences or within specified time intervals. Of particular note, user behavior information 139 may include behavior information related to when closed captioning information may be useful for a user. For example, a rewind command followed by a volume increase command within a specified time interval may indicate a closed captioning on request 510. And a subsequent volume decrease command may indicate a closed captioning off request 515.

In an embodiment, platform server 120 may determine that closed captioning information may be useful during playback of a portion of program 505 (e.g., including playback to a particular user or subset of users) in a variety of different ways, based on different user behaviors (or combinations thereof). For example, client 150A may receive a manual button push/request/command to turn closed captioning on/off during playback of portions of program 505. These requests may be received as CC-on 510 and CC-off 515 requests and associated with those portions of program 505. Or, for example, input device 170 may include an option that rewinds a portion of program 505 and automatically turns on closed captioning for that rewound portion of program 505, and then turns closed captioning off after playback of the rewound portion. This feature is described in greater detail in U.S. patent application Ser. No. 13/778,094, filed Feb. 26, 2013, issued as U.S. Pat. No. 9,363,575, which is hereby incorporated by reference in its entirety. User behavior information 139 may reflect such operations as CC-on 510 and CC-off 515 requests associated with the respective portions of the program 505.

Platform server 120 may also determine closed captioning may be useful based on user behaviors not directly associated with closed captioning functionality. For example, a user increasing volume at a particular portion of program 505 may indicate that closed captioning may be helpful during that portion. Or, for example, as noted above, a user may rewind a portion of program 505 and increase the volume during the replayed portion (and/or toggle closed captioning on). In either scenario, a subsequent reduction in volume may similarly signal that closed captioning may no longer be needed. The volume adjustment and/or rewind may indicate that closed captioning may be beneficial during an associated portion of program 505 (e.g., because the user was unable to discern what was said in program 505). Such information may be stored as CC-on 510 and CC-off 515 requests.

This closed captioning user behavior 135 may be tracked by multiple client devices 150A-D spread across different users and different geographic areas and which may interact with different users watching different programs 505. The various tracked user behavior information 139, including information for closed captioning for example, may be periodically or in real-time, provided to platform server 120 and may be aggregated as aggregated user behavior information 520. Such crowd sourcing of user behavior information 139 may then be used by platform server 120 to enhanced user's enjoyment of content. In some embodiments, for example, such crowd sourced user behavior information can be used to automatically turn closed captioning on and off when a user watches, listens to or otherwise experiences content.

In particular, platform server 120 may aggregate closed captioning information based on which program 505 that users were watching/viewing on their client devices 150A-D at different times when the closed captioning related actions (e.g., closed captioning requests) were detected. For a particular program 505, platform server 120 may analyze the closed captioning information (that in, CC-on 510 and CC-off 515 information) to identify patterns or similarities as to when closed captioning requests were made during the course of the program 505.

A closed captioning request (e.g., which includes actions or combinations of actions determined to be related to closed captioning as described above) may be made by a user for any different number of reasons. For example, the request may indicate a portion of program 505 when sound was difficult to hear, a user was distracted, there may have been noise at the user's location, as well as other audio issues. There could be any number of different reasons why a user may turn on/off closed captioning, including accidental button pushes by the user.

As such, platform server 120 identifies similarities and overlaps between multiple closed captioning requests across different users watching the same program 505. Based on a particular threshold 540 of overlap being detected across different users, platform server 120 may determine that turning closed captioning on may be helpful for users at particular portion(s) of the program 505 (for example, when the sound may obstructed or voices are difficult to hear).

Based on the analysis of the various user behavior information received from different users watching a particular program 505, platform server 120 may determine overlaps and/or patterns as to when closed captioning requests were made. For example, a number of users may have all requested closed captioning to be turned on at around timestamp 17:00 and then turned off around timestamp 17:45 of program 505. Based on the number of users requesting closed captioning exceeding a threshold 540, platform server 120 may determine that for future/current playbacks of program 505, closed captioning should be automatically turned on at or around timestamp 17:00 and turned off at or around timestamp 17:45. In an embodiment, threshold 540 may indicate a maximum time interval that determines that two different CC-on 510 requests are directed to overlapping portions of program 505. In an embodiment, users may override such automatic close captioning functionality via setting the associated menu option.

Platform server 120 may use one or more thresholds 540 to determine when turning on closed captioning information may be useful for users watching program 505. Platform server 120 may compare aggregated user behavior information 520 against threshold(s) 540 to determine when closed captioning should be automatically turned on/off during a playback of program 505.

In an embodiment, threshold 540 may indicate a minimum number or percentage of users that need to have been deemed to request closed captioning (based on aggregated user behavior info 520) at one or more points during program 505. Platform server 120 may use threshold 540 to account for users who may have requested closed captioning based on a user's particular circumstances while viewing program 505, such as background noise, a hard of hearing user, or user equipment issues by requiring that a threshold number of users requested closed captioning during an overlapping portion of program 505. In an embodiment, threshold 540 may also indicate a minimum amount of time for which closed captioning must have been requested (e.g., prior to receiving a subsequent toggle request to turn it off), so that platform server 120 may account for accidental closed captioning requests made by the user (e.g., by an errant button push).

Once platform server 120 determines that a minimum number of users (exceeding threshold 540) requested closed captioning during at least one overlapping portion of program 505 and that any other applicable closed captioning threshold(s) 540 have been satisfied, platform server 120 may compute, calculate, or otherwise determine start time 525 and end time 530. Start time 525 may indicate a time as to when closed captioning should automatically be displayed for a user viewing program 505. Correspondingly, end time 530 may indicate when the closed captioning should be automatically turned off for the user viewing program 505.

User behavior information 139 may track during which portion(s) of program 505 different users had closed captioning on/off. CC-on 510 may indicate when in the playback of program 505 a request for closed captioning to be turned on was received/processed. Similarly, CC-off 515 may indicate when in the playback of program 505 a request for closed captioning to be turned off was received/processed. Platform server 120 may then compare the information 139 across different users to determine whether enough overlap occurs with enough users to satisfy threshold 540.

Platform server 120 may compute start time 525 and end time 530 any different number of ways. In an embodiment, platform server 120 may indicate that two different closed captioning requests are directed to the same portion of program 505 if they overlap in play time (e.g., a counter or indicator as to how much time has lapsed or is left in the playback of program 505) of at least a minimum threshold 540. However, the exact CC-on 510 and CC-off 515 times for different users could nonetheless vary. The CC-on 510 and CC-off 515 times may indicate a playback time or timestamp relative to the program 505 being played or streamed (e.g., indicating how much time of the program 505 has passed or is remaining).

Platform server 120 may determine a preferred time to automatically start 525 and end 530 closed captioning information during a playback of program 505. In an embodiment, platform server 120 may discount or disregard closed captioning requests that are associated with a user that commonly uses closed captioning, or that were requested much earlier in program 505 than the overlap time. Or, for example, a CC-on 510 may not have a corresponding CC-off 515 (because a user may never have turned off closed captioning once it was activated). As such, the CC-off 515 time for that user may not be used or may be discounted in determining end time 530. Or, for example, a default CC-off 515 interval may be determined, or CC-off 515 may be determined to coincide with an ending of the program 505, or bookmarked portion of the program 505 (such as the end of a scene or chapter in which CC-on 510 was requested, or a subsequent scene/chapter).

In an embodiment, to compute the start time, platform server 120 may average the CC-on 510 times for requests that are determined to overlap and exceed threshold 540. In an embodiment, platform server 120 may determine the average CC-on time 510, and then signal that closed captioning information is to begin at the average time or a period of time just before start time. For example, if the average CC-on time is 17:00 minutes into program. Then start time 525 may be at 16:59 minutes, just prior to average CC-on time.

Similarly, platform server 120 may determine end time 530 based on the average CC-off 515 times. Platform server 120 may discount or disregard the CC-off 515 times for users who never turned closed captioning off through the remainder of program 505, or whose CC-off times exceed a threshold 540 time beyond the overlap time period. Platform server may compute an average CC-off 515 time and use that as end time 530. In an embodiment, platform server 120 may use the average as end time 530 or add or subtract an additional period of time beyond the average CC-off time 515 during which to display closed captioning information. For example, if the average CC-off time is 18:01, then platform server may determine end time 530 to be 18:03.

A movie (e.g., program 505) may be sub-divided into different segments (e.g., chapters, or scenes) that are selectable by a user from which to begin viewing the movie or which the user can skip to during a playback of the movie. In an embodiment, platform server 120 may determine a scene, chapter, or other bookmarked portion corresponding to start-time 525. So, for example, if start time 525 is 20:23, platform server 120 may determine that corresponds to chapter 4 of the movie. Similarly, platform server 120 may determine which chapter or segment corresponds to end time 530. Then, for example, during a playback of the movie, the closed captioning or subtitle information may begin and end with the beginning or ending of scenes or chapters of program 505.

This closed captioning start time 525 and end time 530 information may then be provided with program 550 to one or more client devices 150A-D that may be viewing or may have requested to view program 505. In an embodiment, start time 525 and end time 530 may be provided along with program 505. Then, for example, when a client device 150A reaches the indicated start time 525, it may signal or provide closed captioning information to be displayed at start time 525. And, when end time 530 is reached, the closed captioning information may no longer be provided, or a display driver or device may be signaled to turn off the closed captioning information. Both may be performed automatically, without user interaction.

In an embodiment, a user at a client device 150A-D may opt in or out of automated closed captioning provided by platform server 120. User behavior information 139 may include information as to when closed captioning was automatically started/ended by system 500, and any user interactions that may have occurred during that time. For example, user behavior information 139 may track any manual requests to turn on/off closed captioning information, including information that was automatically displayed, and whether the user took no action when closed captioning was automatically turned on/off. This information 139 may be used to improve the functionality of automated closed captioning described herein.

For example, the tracked user behaviors 139 of users who have automated closed captioning turned on may be monitored and used to improve start time 525 and end time 530. For example, a user, for whom closed captioning automatically begins, may immediately (e.g., with an identified threshold 540) turn off the closed captioning, indicating that the user did not want the closed captioning information. Similarly, a user may manually request or begin closed captioning prior to start time 525, indicating that start time 525 may need to be adjusted or that closed captioning may be useful during other portions of the program 505 as well.

Similarly or alternatively, a user may manually turn off closed captioning prior to end time 530, indicating that end time 530 may need to be moved up. Or, for example, after end time 530 has been reached, a user may manually turn closed captioning back on, indicating that either end time 530 needs to be extended or that a new portion of program 505 may require closed captioning. In an embodiment, platform server 120 may then adjust start time 525 and end time 530 on a global (across a plurality of different users at different client devices 150A-D), local (across one or more users on a particular client device 150A), or a user basis (for a particular user on one or more client devices 150A) based on the updated CC-on 510 and/or CC-off 515 requests.

In an embodiment, platform server 120 may group users based on their closed captioning request behavior 135. For example, platform server 120 may determine that people who request closed captioning during a first portion of program 505, also usually request closed captioning during a second and third portion of program 505 (or during a portion of another program 505). Then, for example, during playback, if user behavior information determines that a user requested closed captioning during the first portion of program 505, system 500 may automatically provide closed captioning during the second and third portions of program 505 (and/or during the portion of the other program 505). User responses to the automated closed captioning may then be tracked by user behavior information 139.

Figure 6:
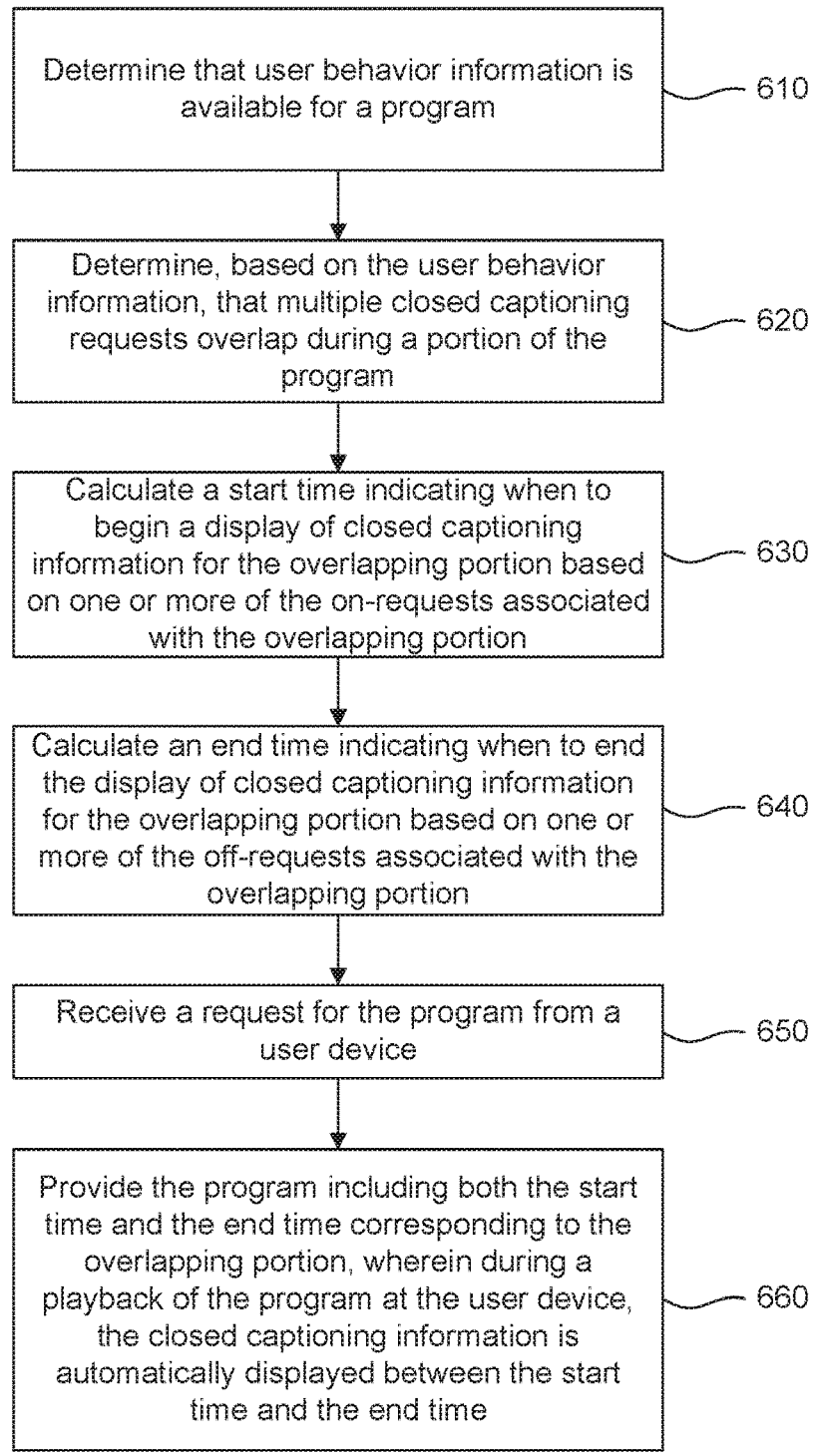
FIG. 6 is a flowchart for a method for automatically displaying closed captioning information, according to an example embodiment.

FIG. 6 is a flowchart for a method 600 for distributed voice processing, according to an embodiment. Method 600 can be performed by processing logic that can comprise hardware (e.g., circuitry, dedicated logic, programmable logic, microcode, etc.), software (e.g., instructions executing on a processing device), or a combination thereof.

At 610, it is determined that user behavior information is available for a program. For example, platform server 120 may determine that aggregated user behavior information 520 is available for a particular program 505 requested by or otherwise available to client 150A. Aggregated user behavior information 520 may indicate when users across one or more clients 150A-D made closed captioning requests (510, 515) during one or more previous playbacks of program 505 or a portion of program. The closed captioning requests include both closed captioning (CC) on or CC-on requests 510 that may indicate when closed captioning information would be useful or beneficial during the playback and CC-off requests 515 that may indicate when closed captioning information would no longer be useful or desired during a playback of program 505.

At 620, it is determined, based on the user behavior information, that multiple closed captioning requests overlap during a portion of the program. For example, platform server 120 may determine, based on aggregated user behavior info 520, that multiple CC-on 510 requests overlap during a portion of program 505. For example, a first CC-on 510 request may indicate a timestamp of 8:23 of program 505 (with a corresponding CC-off request 515 of 8:45), while a second CC-on 510 request may indicate a timestamp of 8:30 (with a corresponding CC-off request 515 of 9:00). Platform server 120 may indicate that there is an overlap in CC-on requests between 8:30-8:45 of program 505.

In an embodiment, threshold 540 may indicate whether two CC-on requests 510 are associated with the same or overlapping portion of program. For example, threshold 540 may be 60 seconds. Then, if a first CC-on 510 request is received at 23:23 and a second CC-on request 510 is received at 25:00, based on threshold 540, the requests may be associated with different portions of program 505. In another embodiment, if the first and second CC-on requests overlap (for example, both have CC-off 515 requests at 27:00), then platform server may indicate that the overlapping portion between 25:00-27:00 would benefit from closed captioning.

At 630, a start time indicating when to begin a display of closed captioning information for the overlapping portion is calculated or determined based on one or more of the on-requests associated with the overlapping portion. For example, platform server 120 may calculate start time 525 based on CC-on 510 times as provided by aggregated user behavior info 520. Any different number of methods may be used to determine start time 525. For example, an average CC-on 510 times may be used, the earliest CC-on 510 time of a related group of CC-ons may be used, or start time 525 may correspond to a particular scene, chapter, or other section of program 505.

At 640, an end time indicating when to end the display of closed captioning information for the overlapping portion is calculated based on one or more of the off-requests associated with the overlapping portion. For example, platform server 120 may calculate end time 530 based on CC-off 515 times as provided by aggregated user behavior info 520. Any different number of methods may be used to determine end time 530. For example, an average CC-off 515 times may be used, the latest CC-off 515 time of a related group of CC-offs may be used, or end time 530 may correspond to a particular scene, chapter, or other section of program 505.

At 650, a request for the program is received from the user device. For example, platform server 120 may receive a request for program 505 from client 150A. Or, for example, client 150A may receive a request to access program 505 from another device (e.g., television, computer, phone, tablet, etc.).

At 660, the program including both the start time and the end time corresponding to the overlapping portion is provided responsive to the request. For example, platform server 120 may make program 505 available for playback on client 150A or another device. During a playback of the program 505, the closed captioning information may automatically displayed between the start time 525 and the end time 530 on those systems that have an automated closed captioning option enabled or turned on.

In some embodiments, platform server 120 may group users based on tracking and analysis of their content viewing patterns, such as the portions of contents (such as movies) that are watched once or multiple times, and the portions that are skipped. Users with similar viewing patterns may be grouped together, and a closed captioning profile for the group may be generated for a particular movie (or other content) based on the closed captioning activity of the users in the group who have watched the movie. Thereafter, the platform server 120 may cause close captioning to be turned on or off for a user when watching the movie based on the respective closed captioning profile for the group in which the user is a member. For example, operation of flowchart 600 may be focused on the group to which the user belongs.

Additionally or alternatively, in some embodiments, users may be clustered into groups based on user interface (UI) browsing behavior patterns. For example, how a user navigates through the menu structure where content is listed for selection may be tracked. For example, any combination of the following GUI navigation behavioral characteristics may be tracked: (1) the order in which icons/tiles/options are navigated; (2) icons/tiles/options over which the user lingered; (3) icons/tiles/options that the user visited multiple times during a session; and/or (4) icons that the user clicked (these examples are provided for illustrative purposes only and are not limiting; any other UI navigational characteristic may also or alternatively be tracked. Similar to that just described, users with similar GUI navigation patterns may be grouped together, and a closed captioning profile for the group may be generated for a particular movie (or other content) based on the closed captioning activity of the users in the group who have watched the movie. Thereafter, the platform server 120 may cause close captioning to be turned on or off for a user when watching the movie based on the respective closed captioning profile for the group in which the user is a member.

Clustering users based on content viewing patterns and/or GUI navigation patterns and then customizing the user viewing experience (such as turning closed captioning on and off, for example) is further described in U.S. patent application titled "Recommending Content Based On User Behavior Tracking And Analysis" by Sylvain Louboutin, filed on Nov. 21, 2016, which is herein incorporated by reference in its entirety.

Figure 7:
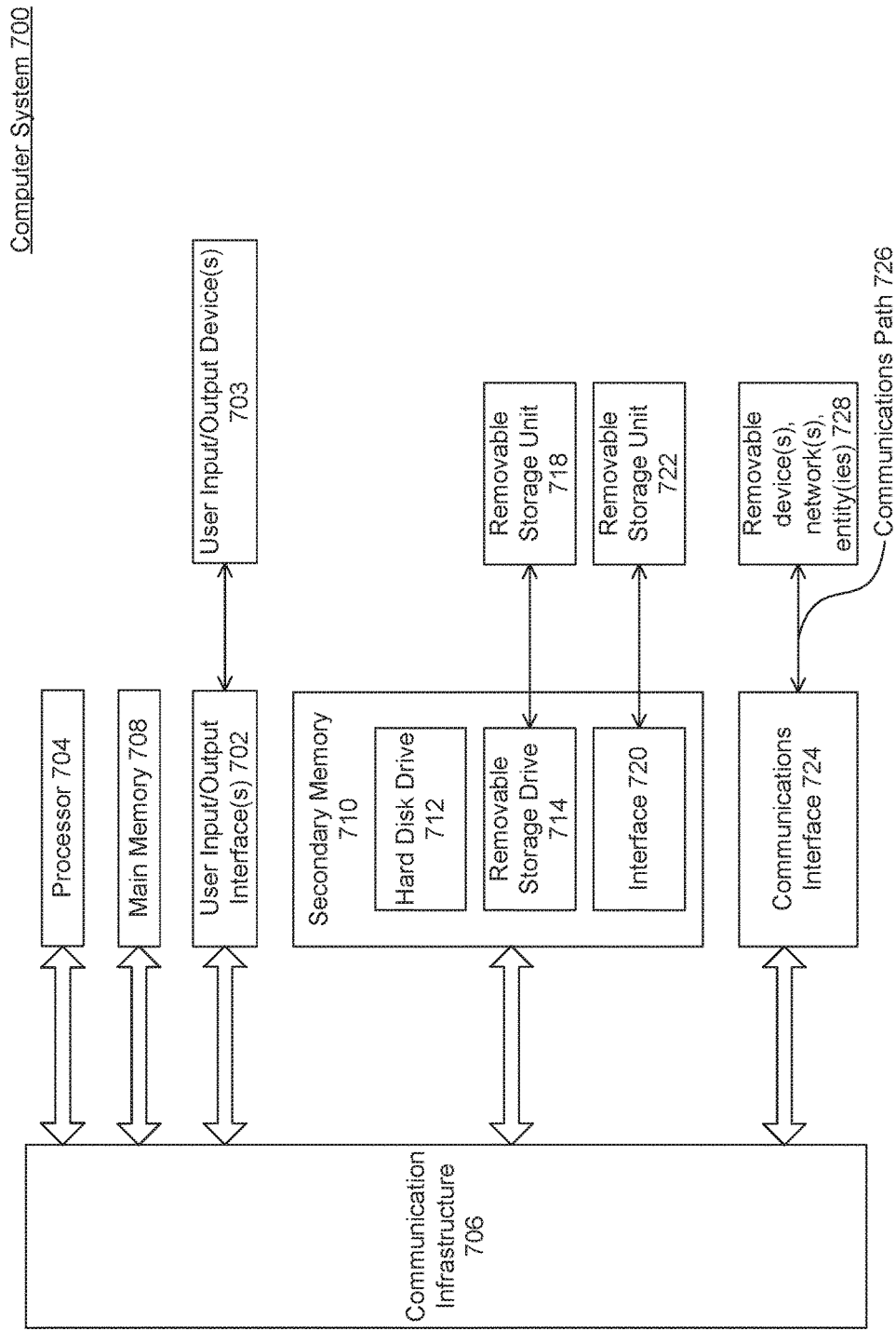
FIG. 7 is an example computer system useful for implementing various embodiments.

Various embodiments can be implemented, for example, using one or more well-known computer systems, such as computer system 700 shown in FIG. 7. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   providing a program for display on a user device;
   determining a plurality of closed captioning requests associated with the program, wherein the plurality of closed captioning requests were received from one or more other user devices to which the program was previously provided;
   determining that the plurality of closed captioning requests exceed a first threshold, wherein the first threshold indicates a minimum number of user devices from which a closed captioning request was received;
   determining a start time corresponding to the plurality of closed captioning requests;
   determining an end time corresponding to the plurality of closed captioning requests; and
   providing closed captioning corresponding to the program for display between the start time and the end time.

2. The method of claim 1, wherein the providing the closed captioning comprises:
   determining that the start time has been reached; and
   providing the closed captioning with the program based on the determination that the start time has been reached.

3. The method of claim 1, further comprising:
    determining that each of the plurality of closed captioning requests exceed a second threshold indicating a minimum length of time between the start time and the end time for a respective closed captioning request.

4. The method of claim 1, wherein the determining the plurality of closed captioning requests comprises:
    determining that a particular one of the plurality of closed captioning requests exceeds a third threshold indicating a maximum amount of time between the start time and the end time for a respective closed captioning request, and wherein the plurality of closed captioning requests exceeds the first threshold exclusive of the particular closed captioning request.

5. The method of claim 1 wherein the start time corresponds to a first pre-defined segment of the program, and wherein the end time corresponds to a second pre-defined segment of the program.

6. The method of claim 2, further comprising:
    determining that the end time has been reached; and
    providing the program without the closed captioning based on the determination that the end time has been reached.

7. The method of claim 3, wherein the determining the end time comprises:
    determining that each of the plurality of closed captioning requests does not exceed a third threshold indicating a maximum amount of time between the start time and the end time for the respective closed captioning request.

8. The method of claim 5, wherein the first pre-defined segment and the second pre-defined segment are a same chapter of the program.

9. A system, comprising
    a memory; and
    at least one processor communicatively coupled to the memory, configured to perform operations comprising:
    providing a program for display on a user device;
    determining a plurality of closed captioning requests associated with the program, wherein the plurality of closed captioning requests were received from one or more other user devices to which the program was previously provided;
    determining that the plurality of closed captioning requests exceed a first threshold, wherein the first threshold indicates a minimum number of user devices from which a closed captioning request was received;
    determining a start time corresponding to the plurality of closed captioning requests;
    determining an end time corresponding to the plurality of closed captioning requests; and
    providing closed captioning corresponding to the program for display between the start time and the end time.

10. The system of claim 9, wherein the at least one processor that provides the closed captioning is further configured to perform operations comprising:
    determining that the start time has been reached; and
    providing the closed captioning with the program based on the determination that the start time has been reached.

11. The system of claim 9, wherein the at least one processor is further configured to perform operations comprising:
    determining that each of the plurality of closed captioning requests exceed a second threshold indicating a minimum length of time between the start time and the end time for a respective closed captioning request.

12. The system of claim 9, wherein the at least one processor that determines the plurality of closed captioning requests is configured to perform an operation comprising:
    determining that a particular one of the plurality of closed captioning requests exceeds a third threshold indicating a maximum amount of time between the start time and the end time for a respective closed captioning request, and wherein the plurality of closed captioning requests exceeds the first threshold exclusive of the particular closed captioning request.

13. The system of claim 9, wherein the start time corresponds to a first pre-defined segment of the program, and wherein the end time corresponds to a second pre-defined segment of the program.

14. The system of claim 10, wherein the at least one processor is further configured to perform operations comprising:
    determining that the end time has been reached; and
    providing the program without the closed captioning based on the determination that the end time has been reached.

15. The system of claim 11, wherein the at least one processor is further configured to perform an operation comprising:
    determining that each of the plurality of closed captioning requests does not exceed a third threshold indicating a maximum amount of time between the start time and the end time for the respective closed captioning request.

16. The system of claim 13, wherein the first pre-defined segment and the second pre-defined segment are a same chapter of the program.

17. A non-transitory computer-readable device having instructions stored thereon that, when executed by at least one computing device, cause the at least one computing device to perform operations comprising:
    providing a program for display on a user device;
    determining a plurality of closed captioning requests associated with the program, wherein the plurality of closed captioning requests were received from one or more other user devices to which the program was previously provided;
    determining that the plurality of closed captioning requests exceed a first threshold, wherein the first threshold indicates a minimum number of user devices from which a closed captioning request was received;
    determining a start time corresponding to the plurality of closed captioning requests;
    determining an end time corresponding to the plurality of closed captioning requests; and
    providing closed captioning corresponding to the program for display between the start time and the end time.

18. The non-transitory computer-readable device of claim 17, wherein the at least one computing device that provides the closed captioning performs operations comprising:
    determining that the start time has been reached;
    providing the closed captioning with the program based on the determination that the start time has been reached;
    determining that the end time has been reached; and
    providing the program without the closed captioning based on the determination that the end time has been reached.

19. The non-transitory computer-readable device of claim 17, wherein the instructions cause the at least one computing device to further perform operations comprising:

determining that each of the plurality of closed captioning requests exceed a second threshold indicating a minimum length of time between the start time and the end time for a respective closed captioning request.

20. The non-transitory computer-readable device of claim 17, wherein the start time corresponds to a first pre-defined segment of the program, and wherein the end time corresponds to a second pre-defined segment of the program.

* * * * *